United States Patent
Nordback (10) Patent No.: US 8,477,364 B2
(45) Date of Patent: Jul. 2, 2013

(54) PRINTING USING A SKELETON ELECTRONIC DOCUMENT AND MULTIPLE CONNECTIONS

(75) Inventor: Kurt N. Nordback, Boulder, CO (US)

(73) Assignee: Konica Minolta Laboratory U.S.A., Inc., San Mateo (CA)

( * ) Notice: Subject to any disclaimer, the term of this patent is extended or adjusted under 35 U.S.C. 154(b) by 253 days.

(21) Appl. No.: 12/982,840

(22) Filed: Dec. 30, 2010

(65) Prior Publication Data
US 2012/0170060 A1   Jul. 5, 2012

(51) Int. Cl.
*G06K 15/02* (2006.01)
(52) U.S. Cl.
USPC .......................................... 358/1.2; 358/1.15
(58) Field of Classification Search
USPC .................................. 358/1.2, 1.15
See application file for complete search history.

(56) References Cited

U.S. PATENT DOCUMENTS

| 2006/0028677 A1 | 2/2006 | Isshiki et al. | |
| 2006/0072156 A1 * | 4/2006 | Shima | 358/1.15 |
| 2008/0266600 A1 * | 10/2008 | Itoh | 358/1.15 |
| 2009/0059271 A1 * | 3/2009 | Henry et al. | 358/1.15 |
| 2012/0026520 A1 * | 2/2012 | Torii | 358/1.11 |

* cited by examiner

*Primary Examiner* — Qian Yang
(74) *Attorney, Agent, or Firm* — Osha Liang LLP (57) ABSTRACT

A method includes: receiving, by a user device (UD), a print job associated with an electronic document (ED) for printing on a printer; identifying, by the UD and within ED, a first element having a first processing requirement and a second element having a second processing requirement; comparing, by the UD, the first processing requirement with multiple processing requirements supported by the printer; generating, by the UD, a skeleton ED by replacing the first element in the ED with a coded marker; sending, by the UD, the skeleton ED to a rasterization service; sending, by the UD, the first image to the printer, where the printer receives a rasterized version of the skeleton ED from the rasterization service, generates a processed element by executing the first processing requirement against the first element, and generates the HD by replacing a marker in the rasterized version with the processed element.

11 Claims, 6 Drawing Sheets

PRINTING USING A SKELETON ELECTRONIC DOCUMENT AND MULTIPLE CONNECTIONS

BACKGROUND

Although the demand for printing electronic documents (EDs) is decreasing because of recent improvements in computer displays, there are still those who generate hardcopies (i.e., permanent readable text and/or graphics, usually on physical print media such as paper, transparencies, microfilm, etc.) of EDs for purposes of reading the EDs. For example, some readers may simply prefer reading a hard copy over staring at a computer screen. In other instances, hardcopies of the EDs may be provided to a group of people at an informal presentation, or in other situations where reading from a projector screen or computer display is not convenient.

An ED often includes various types of elements. Some elements are data heavy but processing light. Some elements are data light but processing heavy. In order to generate a hardcopy of the ED, the ED must be rasterized and users often wish to rasterize the ED using a remote rasterization service. However, transmitting the ED with all the data heavy elements to the remote rasterization service places a significant burden on the connection linking the rasterization service and the transmitting source of the ED. Regardless of this burden, users still wish to use the remote rasterization service.

SUMMARY

In general, in one aspect, the invention relates to a method for generating a hardcopy document (HD). The method comprises: receiving, by a user device (UD), a print job associated with an electronic document (ED) for printing on a printer; identifying, by the UD and within ED, a first element having a first processing requirement and a second element having a second processing requirement; comparing, by the UD, the first processing requirement with a plurality of processing requirements supported by the printer; generating, by the UD and in response to the plurality of processing requirements including the first processing requirement, a skeleton ED by replacing the first element in the ED with a coded marker; sending, by the UD and using a first connection, the skeleton ED to a rasterization service; sending, by the UD and using a second connection, the first image to the printer, wherein the printer receives a rasterized version of the skeleton ED from the rasterization service using a third connection, generates a processed element by executing the first processing requirement against the first element, and generates the HD by replacing a marker in the rasterized version corresponding to the coded marker with the processed element.

In general, in one aspect, the invention relates to a method for generating a hardcopy document (HD). The method comprises: receiving, by a printer and using a first connection, a print job from a user device (UD) and associated with an electronic document (ED); identifying, by the printer and within the ED, a first element having a first processing requirement and a second element having a second processing requirement; comparing, by the printer, the first processing requirement with a plurality of processing requirements supported by the printer; generating, by the printer and in response to the plurality of processing requirements including the first processing requirement, a skeleton ED by replacing the first element in the ED with a coded marker; sending, by the printer and using a second connection, the skeleton ED to a rasterization service; receiving, by the printer and using the second connection, a rasterized version of the skeleton ED from the rasterization service; generating, by the printer, a processed element by executing the first processing requirement against the first element; and generating the HD of the ED by replacing a marker in the rasterized version corresponding to the coded marker with the processed element.

In general, in one aspect, the invention relates to a method for generating a hardcopy document (HD). The method comprises: receiving, by a printer and using a first connection, an element in a print job from a user device (UD) and associated with an electronic document (ED); receiving, by the printer and using a second connection, a rasterized version of the ED comprising a marker identifying the element and a processing requirement of the element; generating, by the printer, a processed element by executing the processing requirement against the element; and generating, by the printer, the HD by replacing the marker with the processed element image.

In general, in one aspect, the invention relates to a system for generating a hardcopy document (HD). The system comprises: a user device (UD) configured to: receive a print job associate with an electronic document (ED); identify, within the ED, a first element having a first processing requirement and a second element having a second processing requirement, and generate a skeleton ED by replacing the first element in the ED with a coded marker, wherein the skeleton ED comprises the second element; a rasterization service executing on a server operatively connected to the UD by a first connection, and configured to: receive the skeleton ED from the UD using the first connection, and rasterize the skeleton ED to generate a rasterized version of the skeleton ED; and a printer, operatively connected to the UD by a second connection and to the rasterization service by a third connection, and configured to: receive the rasterized version from the rasterization service using the third connection, receive the first element from the UD using the second connection, generate a processed element by executing the first processing requirement against the first element, and generate the HD of the ED by replacing a marker in the rasterized version corresponding to the coded marker with the processed element.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for generating hardcopy documents. In one or more embodiments, prior to printing an ED, an element within the ED having light processing requirements (i.e., processing requirements supported by a printer) is extracted from the ED and sent from a user device to a printer by a local connection. The remaining portion(s) of the ED include elements with heavy processing requirements. The remaining portion(s) may be sent, by way of a network connection, to a rasterization service in the form of a skeleton ED. The rasterization service generates a rasterized version of the ED and sends the rasterized version to the printer by a network connection. The printer may generate a hardcopy document by executing the processing requirements of the elements received from the user device and then combining these processed elements with the rasterized version of the ED.

Figure 1:
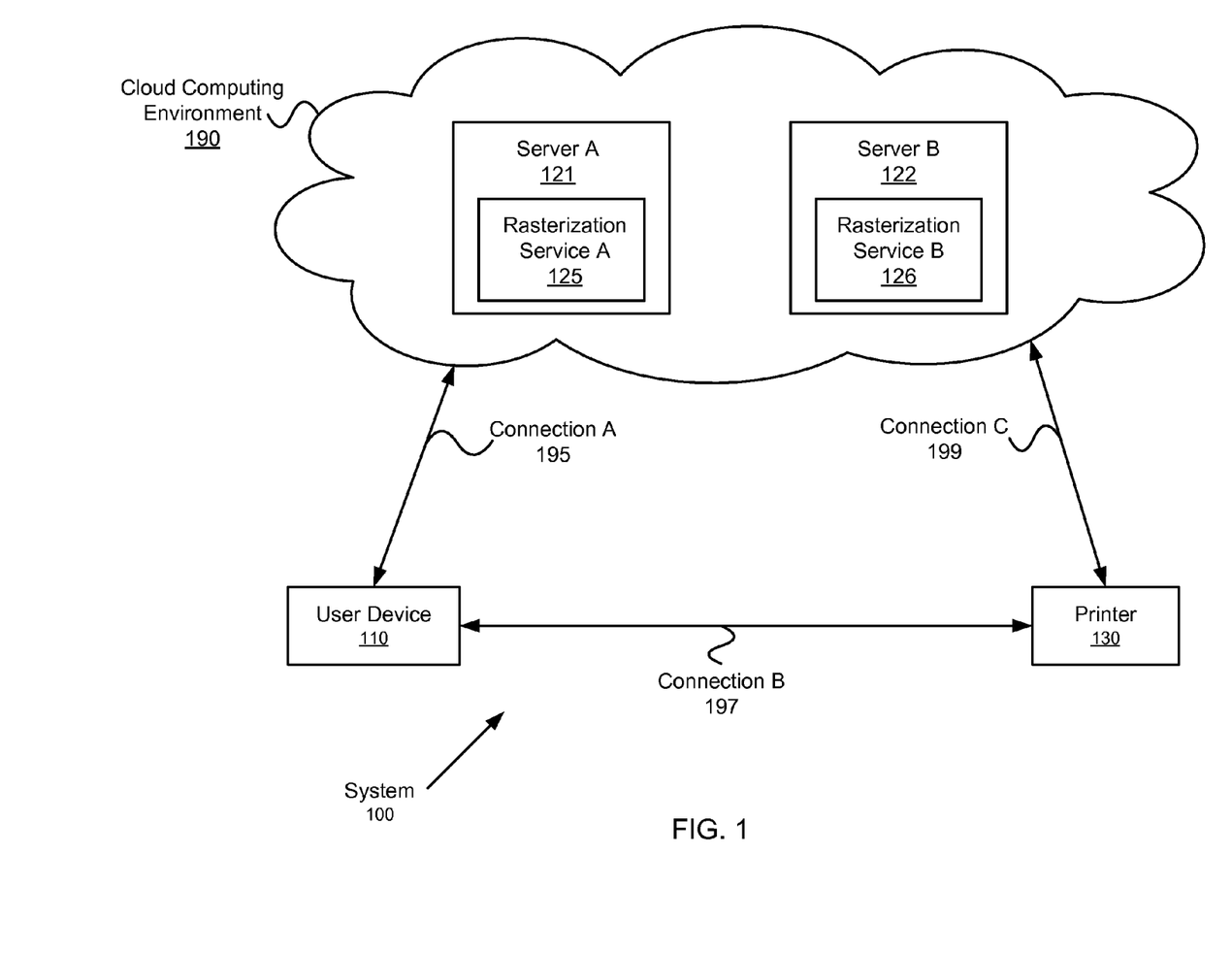
FIG. 1 shows a system in accordance with one or more embodiments of the invention.

FIG. 1 shows a system (100) in accordance with one or more embodiments of the invention. As shown in FIG. 1, the system (100) has multiple components including a user device (UD) (110), one or more servers (i.e., Server A (121), Server B (122)) in a cloud computing environment (190), and a printer (130). The multiple components communicate using one or more of connection A (195), connection B (197), and connection C (199).

As shown in FIG. 1, the UD (110) and the servers (121, 122) are connected by connection A (195). Connection A (195) may be a network of any size with wired and/or wireless segments. For example, connection A (195) may be part of the Internet. As also shown in FIG. 1, the UD (110) and the printer (130) are connected by connection B (197). Connection B (197) may be a local and/or direct connection. For example, connection B (197) may be a universal serial bus (USB) connection, a Bluetooth™ connection, an infrared connection, or any other type of connection with wired and/or wireless segments. Further, as also shown in FIG. 1, the servers (121, 122) and the printer (130) are connected by connection C (199). Connection C (199) may be a network of any size with wired and/or wireless segments. For example, connection C (199) may also be part of the Internet.

In one or more embodiments of the invention, the UD (110) executes a user application (not shown). The UD (110) may be a personal computer (PC), a desktop computer, a mainframe, a server, a telephone, a kiosk, a cable box, a personal digital assistant (PDA), a mobile phone, a smart phone, etc. The user application may be any software application operated by a user and configured to obtain, input, generate, and/or print an ED having any number of pages. For example, the user application may be a word-processing application, a spreadsheet application, a desktop publishing application, a graphics application, a photograph printing application, an Internet browser, etc. The user application may generate new EDs and/or obtain previously saved EDs.

In one or more embodiments of the invention, a print job associated with the ED includes two types of elements: (A) elements which have light processing requirements but are frequently data heavy ("type A"); and (B) elements which have heavy processing requirements but are frequently data light ("type B"). In one or more embodiments of the invention, the printer (130) is configured to handle (i.e., process) type A elements. In one or more embodiments of the invention, the rasterization services (125, 126) are configured to handle (i.e., process) type A elements and type B elements. In one or more embodiments of the invention, the UD (110) maintains a list of processing requirements that are supported by the printer (130) (i.e., processing requirements that can be handled by the printer (130)). Any processing requirement excluded from the list is assumed to be not supported by the printer (130). A user may deliberately remove items from the list of processing requirements. In other words, the list may be modified by the user to exclude one or more processing requirements that are actually supported by the printer (130).

In one or more embodiments of the invention, the ED includes one or more images (e.g., digital photographs). In order to correctly display and/or print the ED, it is necessary to apply transformations to the images. Example transformations include one or more of scaling, rotating, shearing, cropping, color space conversion (e.g., converting from a Red-Green-Blue (RGB) color space to a cyan, magenta, yellow, and black (CMYK) color space), etc. Both the image and the transformation may be disclosed within the ED. In one or more embodiments of the invention, although images are data heavy, some transformations are processing light. Accordingly, an image may be classified as a type A element if the corresponding transformation is processing light. Otherwise, an image may be classified as a type B element if the corresponding transformation is processing heavy.

In one or more embodiments of the invention, embedded fonts and simple shadings are also examples of type A elements found in print jobs described by page description languages (PDLs) (e.g., portable document format (PDF), printer common language (PCL), PostScript, etc.). In one or more embodiments of the invention, the grammar of the PDL that provides the structure to the ED is an example of a type B element.

In one or more embodiments of the invention, the UD (110) is configured to generate a skeleton ED from the ED. Specifically, the UD (110) includes a parser for extracting elements of type A from the ED. In other words, in one or more embodiments of the invention, the skeleton ED does not have any elements of type A (i.e., only elements of type B). In one or more embodiments of the invention, in order to generate the skeleton ED, the type A elements are replaced with coded markers identifying the type A elements and their processing requirements. For example, in the case of images that are type A elements, the coded markers may identify the images and their transformations. The UD (110) may send (i.e., upload), using connection A (195), the skeleton ED to the cloud computing environment (190) for processing by the servers (121, 122). The UD (110) may also send (i.e., forward), using connection B (197), the one or more type A elements directly to the printer (130). Those skilled in the art, having the benefit of this detailed description, will appreciate that the skeleton ED is smaller in size than the ED because of the one or more extracted type A elements which are frequently data heavy.

In one or more embodiments of the invention, the servers (121, 122) execute one or more rasterization services (i.e., Rasterization Service A (125), Rasterization Service B (126)). The rasterization services (125, 126) are configured to process incoming skeleton EDs. Specifically, the rasterization services (125, 126) are configured to rasterize the skeleton EDs. Upon encountering a coded marker (discussed above) in a skeleton ED, the rasterization services (125, 126) are configured to insert a corresponding marker in the rasterized version of the skeleton ED. Moreover, the rasterization services (125, 126) execute the heavy processing requirements of the type B elements in the skeleton ED. The rasterized version of a skeleton ED includes low-level data (e.g., Graphics Device Interface (GDI) data) for consumption by the printer (130). Once the rasterized version of the ED is generated, it may be sent (i.e., downloaded) to the printer (130) using connection C (199). In one or more embodiments of the invention, the rasterization services (125, 126) may also send a list to the printer (130) identifying all the type A elements that have been extracted from the ED. This list is compiled based on the coded markers encountered in the skeleton ED.

In one or more embodiments of the invention, the printer (130) is configured to generate a hardcopy of the ED. Specifically, after receiving the rasterized version of the skeleton ED and the list from the rasterization services (125, 126), and after receiving one or more type A elements on the list from the UD (110), the printer (130) is configured to start printing. Upon encountering a marker in the rasterized version, the printer identifies the corresponding type A element and its processing requirement(s), generates a processed element by executing the processing requirement(s) on the type A element, and places the processed element onto the hardcopy. For example, in the case of a marker corresponding to an image that is a type A element, the printer (130) generates the processed element by performing the corresponding transformation on the image.

In one or more embodiments of the invention, the signal strengths (e.g., bandwidths, throughput, etc.) of connection A (195), connection B (197), and connection C (199) may be monitored by any of the UD (110), the printer (130), and the servers (121, 122). Further, the signal strengths of connection A (195), connection B (197), and connection C (199) may be reported to the UD (110). In one or more embodiments of the invention, when the signal strength of connection C (199) exceeds a pre-determined threshold (e.g., 0.25 Gbps, 1.05 Gbps, 10 Gbps, etc.), the ED (including both type A elements and type B elements and all corresponding processing requirements) is sent to the printer (130) from the UD (110) using connection B (197). In such embodiments, the printer (130) generates the skeleton ED and uploads the skeleton ED to the servers (121, 122) using connection C (199). However, when the strength of connection C (199) does not exceed the pre-determined threshold, the UD (110) generates the skeleton ED (discussed above). In one or more embodiments of the invention, the signal strength of connection C (199) is compared against the pre-determined threshold by the UD (110).

Note that the system (100) is provided for illustrative purposes only, and is not intended to limit embodiments of the invention. In particular, a person of skill in the art will appreciate that the system (100) may be configured in a different manner than that shown in FIG. 1. Further, any of the functionality described above with regard to system (100) may be performed by any number of elements of system (100), whether alone or in combination.

Figure 2:
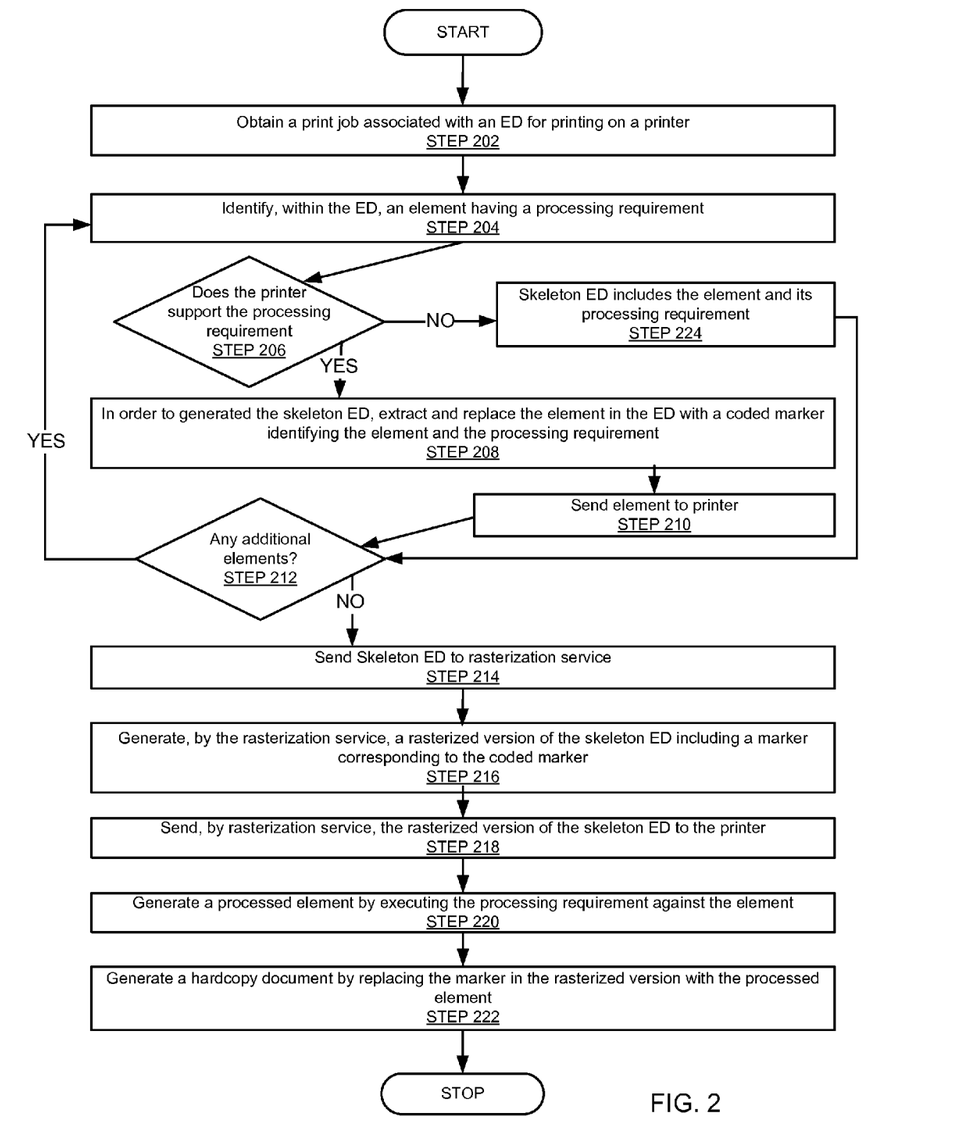
FIG. 2 shows a flowchart in accordance with one or more embodiments of the invention.

FIG. 2 shows a flowchart in accordance with one or more embodiments of the invention. The process shown in FIG. 2 may be implemented using one or more of the components of system (100), discussed above in reference to FIG. 1. Those skilled in the art, having the benefit of this detailed description, will appreciate that the sequence of STEPs shown in FIG. 2 may differ among embodiments of the invention, and that one or more of the STEPs shown in FIG. 2 may be omitted, repeated, performed in parallel, and/or performed in a different order. Accordingly, the specific arrangement of STEPs shown in FIG. 2 should not be construed as limiting the scope of the invention Initially, a print job associated with an ED for printing on a printer is obtained (STEP 202). The print job may be obtained by a user device (e.g., a smart phone) and the ED may be generated/retrieved by any type of user application.

In STEP 204, an element in the ED having a processing requirement is identified. The element may be identified during a parsing of the ED. As discussed above, the element may correspond to one of two types of elements: (A) an element which has light processing requirements but may be data heavy ("type A"); and (B) an element which has heavy processing requirements but may be data light ("type B"). In one or more embodiments of the invention, the printer is configured to handle (i.e., process) primarily type A elements. In other words, in general, the printer is configured to process elements having light processing requirements.

In STEP 206, it is determined whether the printer supports the processing requirement(s) of the element. In one or more embodiments of the invention, the user device maintains a list of processing requirements supported by the printer. The processing requirement of the element may be compared against the list to determine whether the printer supports the processing requirement(s) of the element. As discussed above, the processing requirement(s) supported by the printer frequently correspond to relatively simple processing requirements (i.e., lighter processing requirements). Accordingly, if a processing requirement is identified on the list, it may be assumed that the processing requirement is relatively simple (i.e., relatively light). Similarly, if a processing requirement is excluded from the list, it may be assumed the processing requirement is relatively complex (i.e., relatively heavy). As also discussed above, the list of processing requirements may be modified by a user or system administrator. In other words, one or more processing requirements that are actually supported by the printer, of any level of complexity, may be deliberately removed (i.e., excluded) from the list.

When it is determined that the printer supports the processing requirement, the process proceeds to STEP 208. When it is determined that the printer does not support the processing requirement, the process proceeds to STEP 224.

In STEP 208, a skeleton ED is generated by extracting the element from the ED and replacing the element with a coded marker that identifies the element and the processing requirement of the element. In STEP 210, the extracted element is sent to the printer by a wired and/or wireless local connection (e.g., infrared, Bluetooth™, etc.)

In STEP 224, after it is determined the printer does not support the processing requirement(s) of the element (i.e., the processing requirement is relatively heavy because the element is of type B), the element and its processing requirement (s) are included in the skeleton ED.

In STEP 212, it is determined whether the ED has any additional elements that need to be processed. When it is determined that the ED has additional elements that need to be processed, the process returns to STEP 204. Otherwise, when it is determined that the ED does not have additional elements that need to be processed, the process proceeds to STEP 214.

In STEP 214, the skeleton ED is complete and sent to a rasterization service (e.g., rasterization services (125, 126) discussed above in reference to FIG. 1). The connection used to send the skeleton ED to the rasterization service differs from the connection used to send the element to the printer (i.e., STEP 210).

In STEP 216, the rasterization service generates a rasterized version of the skeleton ED. The rasterization service executes the processing requirement(s) of any elements in the skeleton ED (i.e., type B elements). Further, for every coded marker within the skeleton ED, a corresponding marker is inserted into the rasterized version, and the proper amount of space (i.e., a footprint) must be left on the rasterized page for the associated element. In other words, the rasterization service may rasterize the skeleton ED according to a data format required by the printer, and may replace each coded marker with a marker compatible with the data format required by the printer.

In STEP 218, the rasterization service sends the rasterized version of the skeleton ED to the printer. The connection used to send the rasterized version of the skeleton ED to the printer differs from the connection used to send the element to the printer (i.e., STEP 210).

In STEP 220, the printer generates processed elements. Specifically, type A elements and their processing requirements are identified by the markers in the rasterized version of the skeleton ED. The printer executes the processing requirements against the actual elements received from the UD (i.e., the elements send in STEP 210). Optionally, the execution of the processing requirements may be performed according to data received from the UD (110) with the elements. In this case, the processing requirements can be executed against the elements before the printer has received the rasterized version of the skeleton ED from the rasterization service.

At STEP 222, a hardcopy document is generated by the printer by replacing each marker in the rasterized version of the skeleton ED with the corresponding processed element. After STEP 222, the process ends.

In one or more embodiments of the invention, generation of the skeleton ED and uploading of the skeleton ED to the rasterization service may be performed by the printer. In such embodiments, the ED and elements of both type A and type B are sent to the printer. The printer then generates the skeleton ED and transmits the skeleton ED to the rasterization service (i.e., there is little to no communication between the UD and the rasterization service).

Figure 3A:
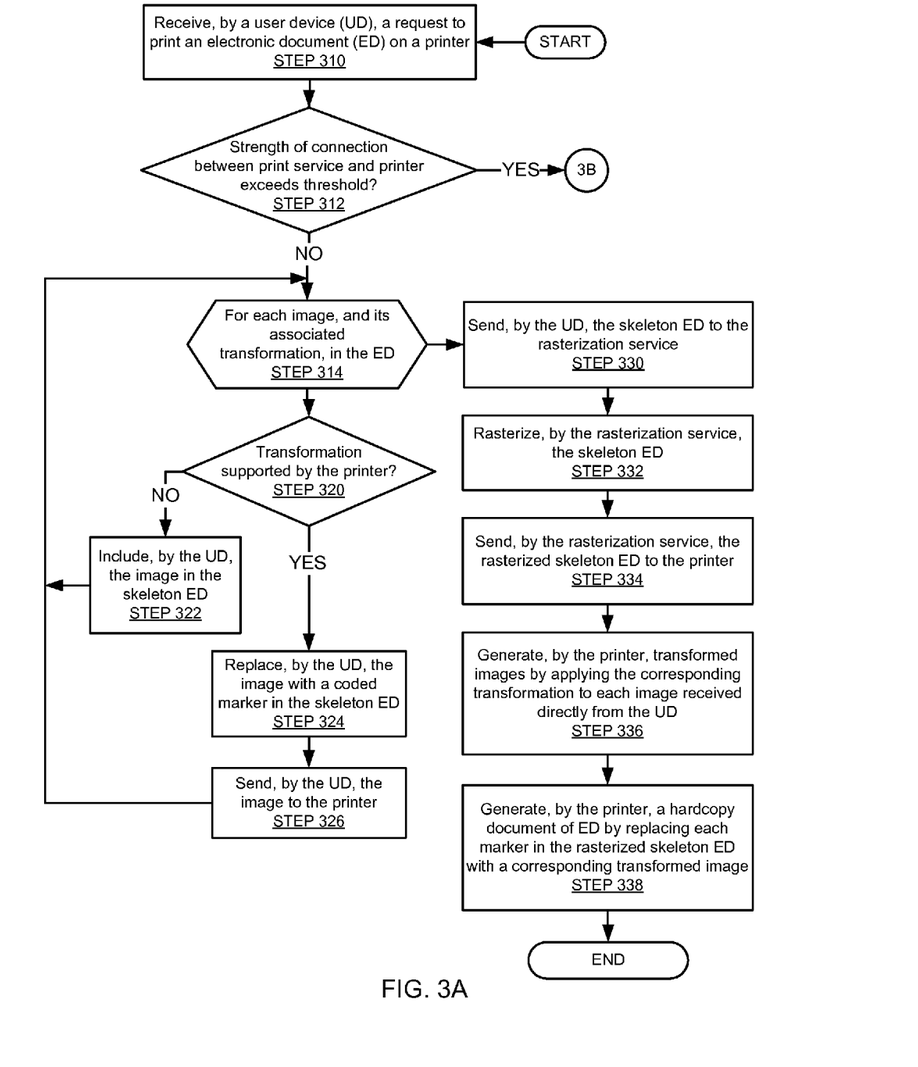
FIGS. 3A, 3B, and 4 show examples in accordance with one or more embodiments of the invention.
Figure 3B:
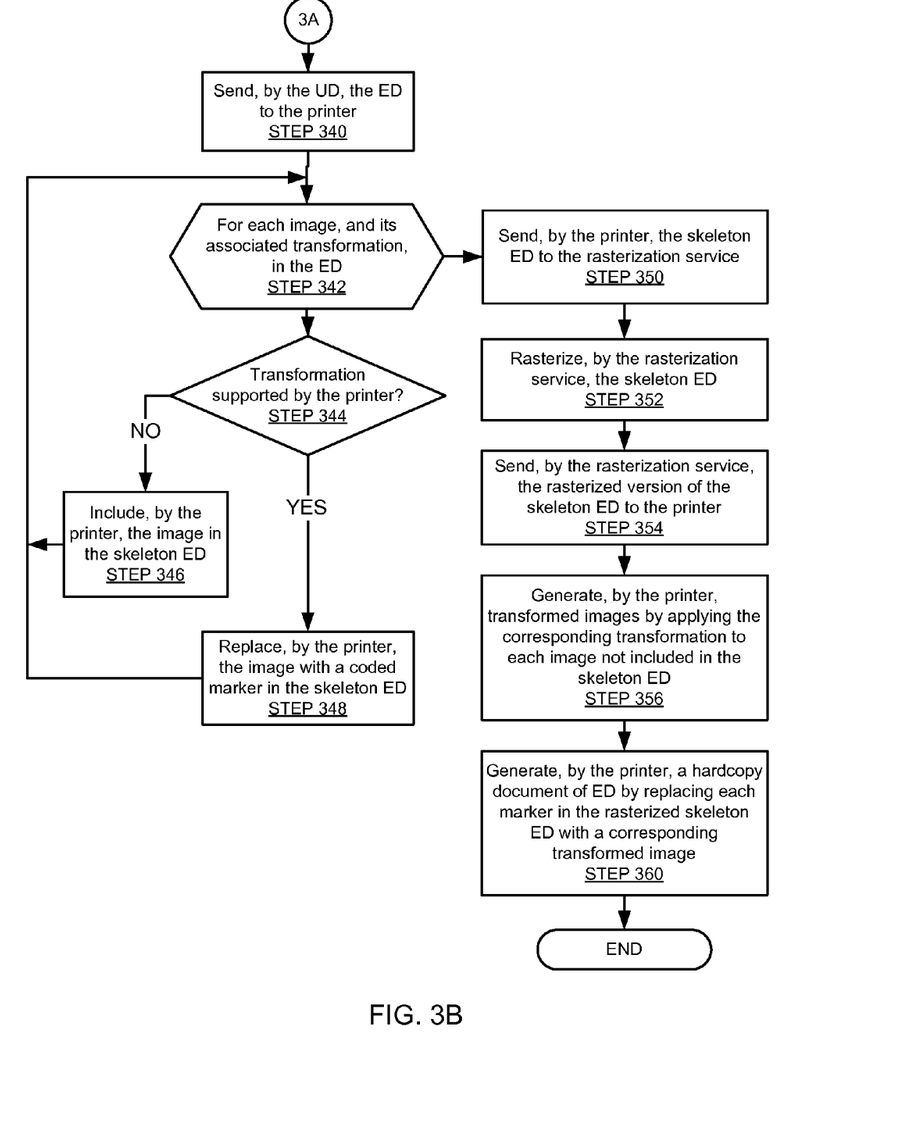

FIGS. 3A and 3B show example flowcharts in accordance with one or more embodiments of the invention. The example flowcharts focus heavily on elements of an ED that are images. Accordingly, the processing requirements of the elements (i.e., images) correspond to transformations (e.g., scaling, rotation, color space conversion, etc.) that need to be applied to the images in order to correctly print the ED.

Referring to FIG. 3A, at STEP 310, a request to print an ED on a printer is received by a UD. For example, referring to FIG. 1, the UD (110) may receive a request to print an ED on the printer (130). The request may correspond to a print command issued by a user of the UD.

At STEP 312, it is determined whether the strength of the connection between the rasterization service and the printer exceeds a predetermined threshold. In one or more embodiments, the connection strength and the predetermined threshold may be expressed using any quantitative or qualitative measurements of the connection (e.g., signal power, ping/response time, drop rate, transmission rate, received signal strength indicator (RSSI), signal quality, etc.). For example, referring to FIG. 1, assume that connection C (199) between rasterization service A (125) and the printer (130) is a wired network connection. In this example, the UD (110) may determine whether the signal strength of connection C (199) exceeds a predetermined threshold. In one or more embodiments, the UD (110) may obtain the strength of connection C (199) from the printer (130) by way of connection B (197).

When it is determined at STEP 312 that the strength of the connection between the rasterization service and the printer exceeds the predetermined threshold, the process continues to FIG. 3B (discussed below). However, when it is determined at STEP 312 that the strength of the connection between the rasterization service and the printer does not exceed the predetermined threshold, the process proceeds to STEP 314.

At STEP 314, a loop (defined by STEPs 314, 320, 322, 324, and 326) is entered for each image with a transformation in the ED in order to generate the skeleton ED. In one or more embodiments, each iteration of the loop (i.e., STEPs 314, 320, 322, 324, and 326) is performed by the UD.

At STEP 320, it is determined whether the current transformation is supported by the printer. For example, referring to FIG. 1, the UD (110) may determine whether the printer (130) is configured to perform the current transformation (e.g., an image rotation).

When it is determined that the current image transformation is not supported by the printer, the process proceeds to STEP 322 where the image corresponding to the current transformation is included in the skeleton ED. However, when it is determined that the current image transformation is supported by the printer, then at STEP 324, the image corresponding to the current image transformation is extracted and replaced with a coded marker in the skeleton ED. The coded marker may include geometric information regarding the image (i.e., dimensions of the image) and any associated geometric transformations, so that the rasterization service is able to leave the proper amount of space (i.e., reserve a footprint) in the rasterized skeleton ED for the transformed image.

At STEP 326, the image corresponding to the current transformation may be sent by the UD to the printer. Optionally, the UD may also send, along with the image, data describing the image transformation to the printer. For example, referring to FIG. 1, the UD (110) may send the image and a description of the image transformation (e.g., transformation type, transformation parameters, etc.) to the printer (130) by way of the connection B (197).

Once all iterations of the loop are completed (i.e., all images and their associated transformations in the ED have been processed), the skeleton ED is complete. Accordingly, at STEP 330, the skeleton ED is sent by the UD to the rasterization service. For example, referring to FIG. 1, the UD (110) may send the skeleton ED to rasterization service A (125) by way of connection A (195).

At STEP 332, a rasterized version of the skeleton ED is generated by the rasterization service. For every coded marker within the skeleton ED, a corresponding marker is inserted into the rasterized version, and the proper amount of space (i.e., a footprint) must be left on the rasterized page for the associated image. For example, referring to FIG. 1, rasterization service A (125) may rasterize the skeleton ED according to a data format required by the printer (130), and may replace each coded marker with a marker compatible with the data format required by the printer (130).

At STEP 334, the rasterized version of the skeleton ED may be sent by the rasterization service to the printer. For example, referring to FIG. 1, rasterization service A (125) may send the rasterized version of the skeleton ED to the printer (130) by way of connection C (199).

At STEP 336, transformed images are generated by the printer by applying the corresponding transformation to each image received from the UD (i.e., each image sent by the UD at STEP 326). For example, referring to FIG. 1, the printer (130) transforms an image received from the UD (110). Optionally, the image transformation may be performed according to data received from the UD (110) describing the transformation. In this case, transformation operations can begin before the printer has received the rasterized skeleton ED from the rasterization service.

At STEP 338, a hardcopy may be generated by the printer by replacing each marker in the rasterized version of the skeleton ED (i.e., each marker included in the rasterized version at STEP 332) with the corresponding transformed image. After STEP 338, the process ends.

Referring now to FIG. 3B, the flowchart shown in FIG. 3B may represent a continuation of the process shown in FIG. 3A. Specifically, the flowchart shown in FIG. 3B may be entered after it is determined that the strength of connection C (199) between the rasterization service and the printer exceeds the predetermined threshold (at STEP 312 shown in FIG. 3A).

At STEP 340, the ED may be sent to the printer by the UD. For example, referring to FIG. 1, the UD (110) may send the ED to the printer (130) by way of connection B (197).

At STEP 342, a second loop (defined by STEPs 342, 344, 346, and 348) is entered to process each transformation in the ED. In one or more embodiments, each iteration of the second loop (i.e., STEPs 342, 344, 346, and 348) is performed by the printer.

At STEP 344, it is determined whether the current transformation is supported by the printer. When it is determined that the current transformation is not supported by the printer, then at STEP 346, the image corresponding to the current transformation is included in a skeleton ED by the printer. However, when it is determined at STEP 344 that the current transformation is supported by the printer, then at STEP 348, the image corresponding to the current transformation is extracted and replaced with a coded marker in the skeleton ED by the printer.

After STEP 348, the processing of the current iteration of the second loop is complete, and the process returns to STEP 342 to begin processing another iteration of the second loop (if any). Once all iterations of the second loop are completed (i.e., all transformations in the ED have been processed), the skeleton ED is complete. Accordingly, at STEP 350, the skeleton ED is sent by the printer to the rasterization service. For example, referring to FIG. 1, the printer (130) may send the skeleton ED to rasterization service A (125) by way of connection C (199).

At STEP 352, a rasterized version of the skeleton ED is generated by the rasterization service. For every coded marker within the skeleton ED, a corresponding marker is inserted into the rasterized version, and a footprint corresponding to the transformed image is reserved on the rasterized page. For example, referring to FIG. 1, rasterization service A (125) may rasterize the skeleton ED according to a data format required by the printer (130), and may replace each coded marker with a marker compatible with the data format required by the printer (130).

At STEP 354, the rasterized version of the skeleton ED may be sent by the rasterization service to the printer. For example, referring to FIG. 1, rasterization service A (125) may send the rasterized version of the skeleton ED to the printer (130) by way of connection C (199).

At STEP 356, transformed images are generated by the printer by applying the corresponding transformation to each image received from the UD (i.e., each image in the ED sent by the UD at STEP 340). For example, referring to FIG. 1, the printer (130) transforms an image received from the UD (110). Optionally, the image transformation may be performed according to data describing the image transformation and received from UD (110).

At STEP 360, a hardcopy may be generated by the printer (e.g., printer (130) shown in FIG. 1) by replacing each marker in the rasterized version of the skeleton ED with a transformed image corresponding to the marker. Note that each marker in the rasterized version of the skeleton ED has replaced a corresponding coded marker (at STEP 352), and that each coded marker has replaced a corresponding image of the ED (at STEP 348), and that each image replaced by a coded marker has been transformed into a corresponding transformed image (at STEP 356). After STEP 360, the process ends.

One of skill in the art will appreciate that, while the flowcharts of FIGS. 3A and 3B are shown as being a single process, any portion of the flowcharts may be performed separately. For example, the flowchart shown in FIG. 3A may be performed while omitting STEP 312. In other words, the process shown in FIG. 3A may be performed without comparing the strength of the connection between the rasterization service and the printer to the predetermined threshold. Note that, in such embodiments, the skeleton ED is always generated by the UD. Similarly, in one or more embodiments, the flowchart shown in FIG. 3B may be performed without first performing STEP 312 shown in FIG. 3A. Note that, in such embodiments, the skeleton ED is always generated by the printer.

Figure 4:
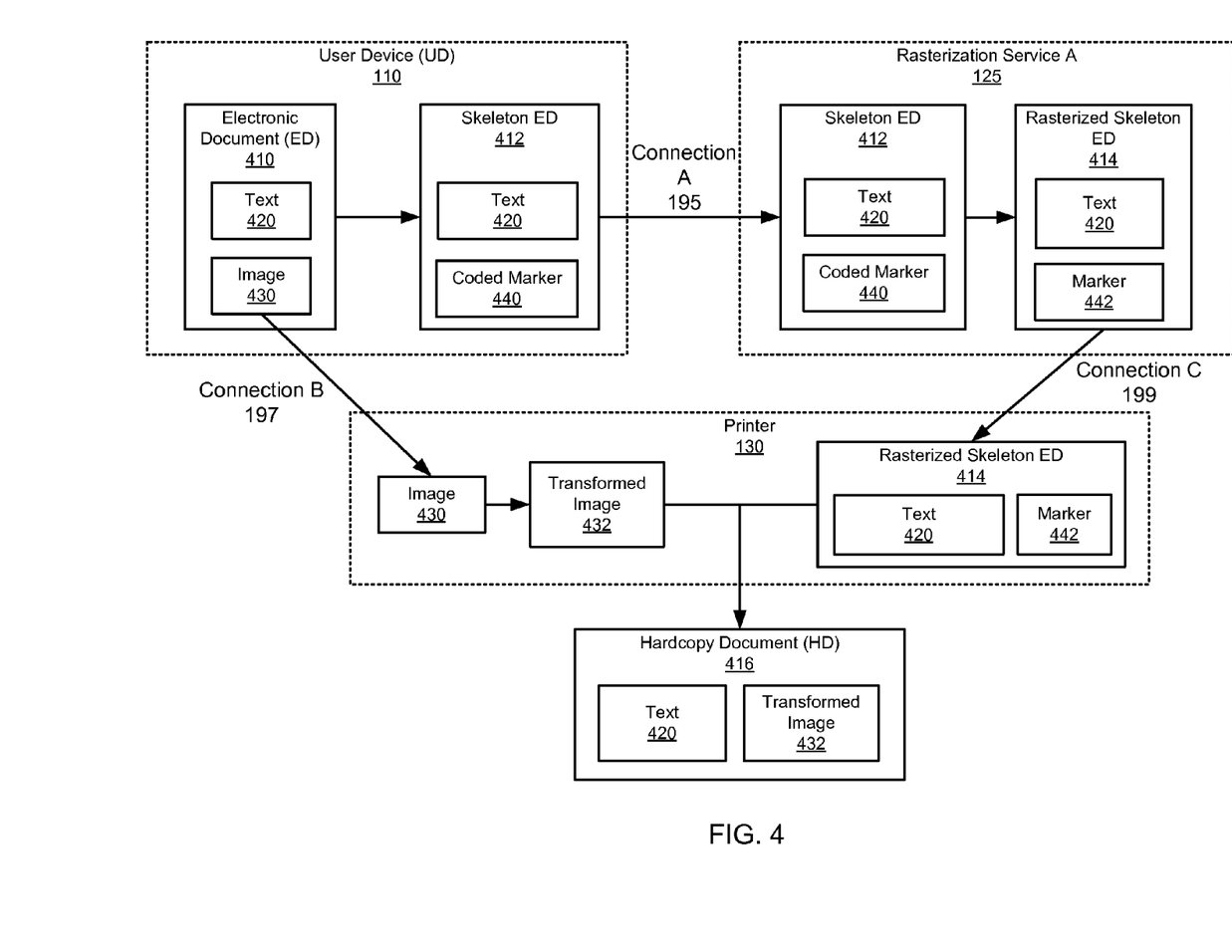

FIG. 4 shows an example in accordance with one or more embodiments of the invention. Specifically, FIG. 4 shows an example of the process illustrated in FIG. 3A. Note that the example shown in FIG. 4 is provided for the sake of illustration, and is not intended to limit embodiments of the invention.

As shown in FIG. 4, an ED (410) is located on the UD (110), and includes text (420) and an image (430). The UD (110) converts the ED (410) to a skeleton ED (412) by replacing the image (430) with a coded marker (440).

The skeleton ED (412) includes the text (420) and the dimensions and geometric transformations associated with the image (430). The UD (110) then sends the skeleton ED (412) to a rasterization service A (125) by way of connection A (195). The UD (110) also sends the image (430) to a printer (130) by way of connection B (197). The printer (130) transforms the image (430) to obtain a transformed image (432).

As shown, rasterization service A (125) rasterizes the skeleton ED (412) to obtain the rasterized version of the skeleton ED (414). The rasterized version of the skeleton ED (414) includes the text (420). Further, the rasterized skeleton ED (414) includes a marker (442) in place of the coded marker (440) of the skeleton ED (412).

Rasterization Service A (125) sends the rasterized version of the skeleton ED (414) to the printer (130) by way of connection C (199). The printer (130) generates a HD (416) by replacing the marker (442) in the rasterized version of the skeleton ED (414) with the transformed image (432).

Embodiments of the invention have one or more of the following advantages: the ability to reduce the bandwidth needed to transmit an ED to a remote rasterization service in a cloud computing environment; the ability to extract and send the elements of an ED to a printer using a separate connection; the ability to select the user device or the printer as the parser of the ED depending on various connection signal strengths; the ability to assign elements having light processing requirements to the printer for processing and elements having heavy processing requirements to a rasterization service for processing; the printer need not have embedded PDL processing capabilities (i.e., the printer needs to only process GDI data streams); etc.

Although this detailed description has focused heavily on the extraction of images from the ED, the processes described may be applied to any item, element, and/or section of the ED that is large in size. In other words, the skeleton ED may be generated by extracting any item, element, and/or section of the ED having a size that exceeds a threshold.

Figure 5:
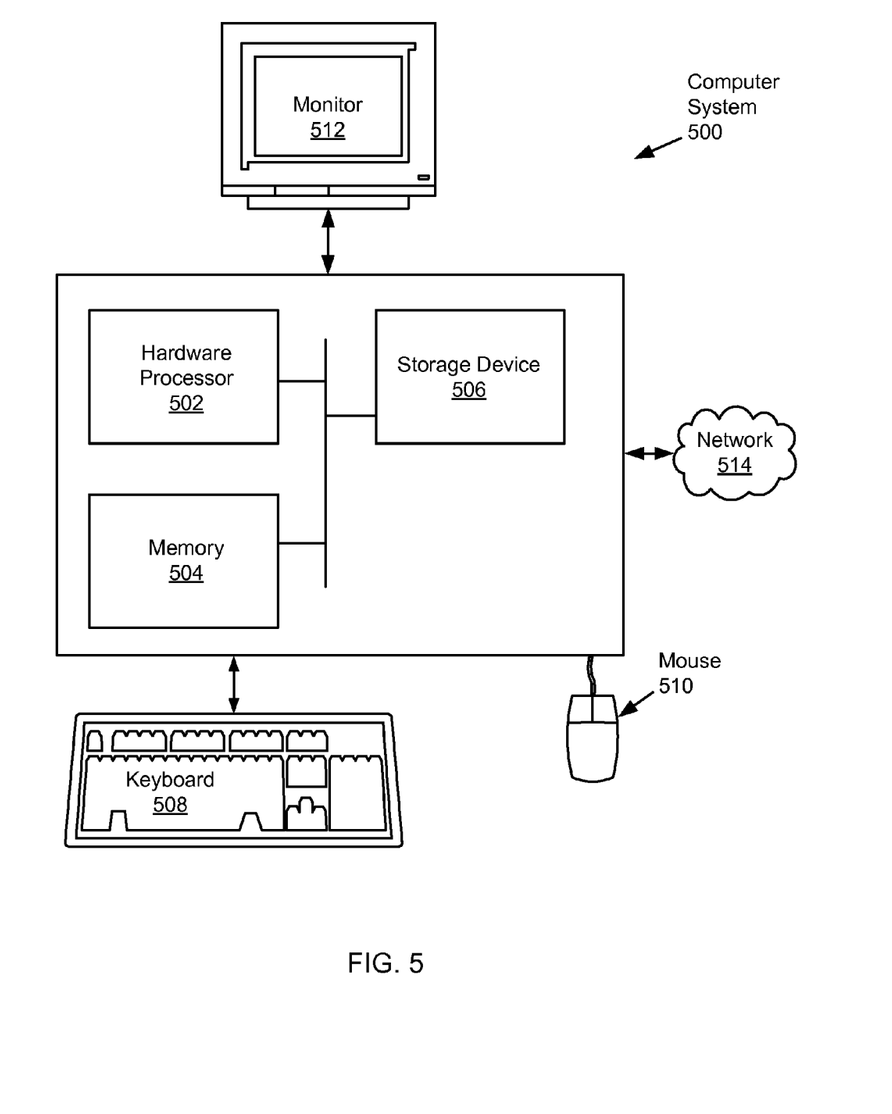
FIG. 5 shows a computer system in accordance with one or more embodiments of the invention.

Embodiments of the invention may be implemented on virtually any type of computer regardless of the platform being used. For example, as shown in FIG. 5, computer system (500) includes one or more processor(s) (502), associated memory (504) (e.g. random access memory (RAM), cache memory, flash memory, etc.), storage device (506) (e.g. a hard disk, an optical drive such as a compact disk drive or digital video disk (DVD) drive, a flash memory stick, etc.), and numerous other elements and functionalities typical of today's computers (not shown). In one or more embodiments of the invention, processor (502) is hardware. For example, the processor may be an integrated circuit. Computer system (500) may also include input means, such as keyboard (508), mouse (510), or a microphone (not shown). Further, computer system (500) may include output means, such as monitor (512) (e.g. a liquid crystal display (LCD), a plasma display, or cathode ray tube (CRT) monitor). Computer system (500) may be connected to network (514) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g. user device, rasterization services, printer) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, punch cards, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a hardcopy document (HD), comprising:
  receiving, by a user device (UD), a print job associated with an electronic document (ED) for printing on a printer, wherein the UD comprises a first connection to a rasterization service, wherein the UD comprises a second connection to the printer, and wherein the printer comprises a third connection to the rasterization service;
  identifying, by the UD and within the ED, a first element having a first processing requirement and a second element having a second processing requirement;
  comparing, by the UD, the first processing requirement with a plurality of processing requirements supported by the printer;
  obtaining, by the UD and using the second connection, a strength of the third connection from the printer;
  comparing, by the UD, the strength of the third connection with a predetermined threshold;
  generating, by the UD and in response to the plurality of processing requirements including the first processing requirement and in further response to the strength of the third connection not exceeding the predetermined threshold, a skeleton ED by replacing the first element in the ED with a coded marker;
  sending, by the UD and using the first connection, the skeleton ED to the rasterization service;
  sending, by the UD and using the second connection, the first element to the printer,
  wherein the printer receives a rasterized version of the skeleton ED from the rasterization service using the third connection, generates a processed element by executing the first processing requirement against the first element, and generates the HD by replacing a marker in the rasterized version corresponding to the coded marker with the processed element.

2. The method of claim 1, further comprising:
  comparing, by the UD, the second processing requirement with the plurality of processing requirements supported by the printer,
  wherein the plurality of processing requirements excludes the second processing requirement, and
  wherein the skeleton ED comprises the second element.

3. The method of claim 2, wherein the second element is an image and wherein the second processing requirement is a rotation of the image.

4. The method of claim 1, wherein the first element is an image and wherein the first processing requirement is a scaling of the image.

5. The method of claim 1, further comprising:
  generating, by the UD, the coded marker comprising an identification of the first element and the first processing requirement.

6. The method of claim 1, wherein the UD is a mobile device and wherein the rasterization service is executing on a server connected to the printer using the third connection.

7. The method of claim 1, wherein the first processing requirement is a color space conversion between a color space of the first element to a color space of the printer.

8. The method of claim 1, wherein the second connection is an infrared connection.

9. A system for generating a hardcopy document (HD), comprising:
  a user device (UD) configured to:
    receive a print job associate with an electronic document (ED),
    identify, within the ED, a first element having a first processing requirement and a second element having a second processing requirement,
    generate a skeleton ED by replacing the first element in the ED with a coded marker, wherein the skeleton ED comprises the second element;
  a rasterization service executing on a server operatively connected to the UD by a first connection, and configured to:
    receive the skeleton ED from the UD using the first connection, and
    rasterize the skeleton ED to generate a rasterized version of the skeleton ED; and
  a printer, operatively connected to the UD by a second connection and to the rasterization service by a third connection, and configured to:
    receive the rasterized version from the rasterization service using the third connection, receive the first element from the UD using the second connection, generate a processed element by executing the first processing requirement against the first element, and generate the HD of the ED by replacing a marker in the rasterized version corresponding to the coded marker with the processed element, wherein the UD is further configured to obtain, using the second connection, a strength of the third connection from the printer and compare the strength of the third connection with a predetermined threshold, and wherein the skeleton ED is generated in response to the strength of the connection not exceeding the predetermined threshold.

10. The system of claim 9, wherein the UD is a mobile device.

11. The system of claim 9, wherein the first element is a first image and the first processing requirement is a scaling of the first image, and wherein the second element is a second image and the second processing requirement is a rotation of the second image.

* * * * *